United States Patent [19]

Shaw et al.

[11] 4,323,310
[45] Apr. 6, 1982

[54] FIBER OPTIC ROTATION SENSING INTERFEROMETER

[75] Inventors: Herbert J. Shaw; Marvin Chodorow, both of Stanford, Calif.

[73] Assignee: The United States of America as represented by the Secretary of the Air Force, Washington, D.C.

[21] Appl. No.: 100,320

[22] Filed: Dec. 5, 1979

[51] Int. Cl.³ ............................................. G01B 9/02
[52] U.S. Cl. ................................................... 356/350
[58] Field of Search ....................................... 356/350

[56] References Cited

U.S. PATENT DOCUMENTS 4,133,612 1/1979 Redman ............................. 356/350

OTHER PUBLICATIONS

Arditty, H. et al, "Re-Entrant Fiberoptic Approach to Rotation Sensing", Spie, vol. 157, p. 138, 12/78.

*Primary Examiner*—William H. Punter
*Attorney, Agent, or Firm*—Donald J. Singer; Jacob N. Erlich

[57] ABSTRACT

A fiber optic rotation sensing interferometer based on the Sagnac effect in which mechanical rotation introduces measurable shifts in the phase of optical signals transversing a closed path. The interferometer includes the closed optical path made up of a multi-turn fiber optic loop, a directional coupler or couplers, and an amplifier. A pulse of electromagnetic radiation is fed into the optical path by means of a pulsed electromagnetic source such as a laser and a beam splitter. The beam splitter splits the pulse into two pulses which undergo multiple circulations about the optical path in opposite directions. The directional couplers nondestructively sample the two pulses after each pass therethrough and send the pair of pulse samples to the beam splitter once each circulation. The beam splitter sends these pulse pair samples to a detector and signal processor once each circulation. The detector measures the instantaneous relative phase shift between the two pulse samples in each of the multiple pulse pairs and outputs phase information once each circulation. This phase information is converted by the signal processor into the angle of rotation or into rotation rate of the interferometer.

10 Claims, 4 Drawing Figures

FIBER OPTIC ROTATION SENSING INTERFEROMETER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to rotation sensors, and, more particularly to a fiber optic rotation sensing interferometer.

In the fields encompassing navigation, guidance and geophysical measurement, conventional gyroscopes leave much to be desired in their sensitivity in the measurement of rotation rates. In recent years, however, a dramatic development has taken place in optical technology with the invention of the so called laser gyroscope. This device combines the properties of the optical oscillator, the laser and an optical effect known as the Sagnac effect to produce an integrating rate gyroscope. A good description of a laser gyroscope can be found in U.S. Pat. No. 4,013,365.

As pointed out in U.S. Pat. No. 4,013,365, the conventional laser gyroscope is a laser that has three or more reflectors arranged to enclose an area. The three reflectors, preferably mirrors, together with the light-amplifying material in the laser path, comprise an oscillator. In fact, there are two oscillations, one that has energy traveling clockwise and one that has energy traveling counterclockwise around the same physical cavity. The two frequencies at which the oscillator operates are determined by the apparent or effective optical path length of the cavity in the clockwise and counterclockwise directions. In order to sustain oscillation, two conditions must be met: (1) the gain must be at least equal to unity at some power level set by the amplifying medium, and (2) the number of wavelengths in the cavity must be an exact integer. If the first condition is to be achieved, the laser operation must be such that the amplifying medium has sufficient gain to overcome the losses at the reflectors and the other elements in the laser path. In addition, the wavelength must be an exact submultiple of the path around the cavity. This last condition actually determines the oscillation frequency of the laser.

When the enclosed ring is rotated in inertial space the clockwise and counterclockwise paths have different apparent lengths. The path difference in these two directions causes the two oscillators to operate at different frequencies. The difference is proportional to the rate at which the ring is rotating since path difference is proportional to inertial rotation rate. The readout of the gyroscope is accomplished by monitoring the frequency difference between the two oscillators. For example a device which falls within the laser gyroscope field is the ring laser gyroscope of the type described by Post, E. J. Rev. Mod. Phys. 39, 2, 475 (1967).

Unfortunately, the current devices using oscillators as described, will not provide an output signal at very low rotation rates as required in such applications as navigation, guidance, etc., due to the fact that the two oscillations, corresponding to propagation of signals in opposite senses around the loop tend to interact in such a way that they lock and give only one frequency and therefore no signal. This mode locking has been a fundamental deficiency to the use of a laser oscillator for rotation sensing.

SUMMARY OF THE INVENTION

The fiber optic rotation sensing interferometer of this invention overcomes the problems set forth in detail hereinabove. This is accomplished by providing a system which, like the ring laser gyroscope, is based on the Sagnac effect, in which mechanical rotation introduces measurable shifts in the phase of optical signals transversing a closed path. The system of this invention is designed to be inherently free of the mode locking effect encountered in the past, which required the use of biasing systems to prevent it from erroneously indicating zero rotation rate for rates below a certain threshold value. In addition, the instant invention is capable of higher sensitivity to rotation as well as being capable of realization in all solid state format and in miniature size.

The fiber optic rotation sensing interferometer of this invention is made up of a closed optical path incorporating therein one or more directional couplers, a bidirectional amplifier (if necessary) and a multi-turn fiber optic loop. An electromagnetic radiation source such as a laser which may incorporate therewith a switch and pulser feeds individual electromagnetic pulses into a conventional four-port optical coupler in the form of, for example, a beam splitter. In all solid state format, the optical coupler could be, for example, a fiber beam splitter in the form of a 3 db directional coupler. Interconnected to the optical coupler is a conventional photo detector and a conventional signal processor as well as the directional coupler or couplers, the bidirectional amplifier and the multi-turn fiber optic loop. The loop of the interferometer of this invention is in the form of a multiplicity N of distinct nondegenerate turns.

Electromagnetic pulses are introduced into the closed path from the laser, whose frequency is independent of the properties of the path, and it is this fact which accounts for the freedom from the mode locking effect. Single optical pulses are interjected into the path by way of the switch which may form part of the laser which feeds the pulses into the beam splitter. The beam splitter splits each input pulse into a pair of pulses and the two pulses in the pair are directed into the closed path by the directional couplers (one bidirectional coupler may, in some instances, be all that is required) so that the pulses circulate in opposite directions around the closed path. The input pulses do not couple directly into the detector.

Each of the input pulses makes a total of p passes around the N turn loop, passing p times through the amplifier (if included within the interferometer). The amplifier, when included within the optical path, operates as a stable non-oscillating amplifier, allowing a large number of circulations of optical waves around the N loop which multiplies the Sagnac effect, increases the total integration time, and thus even more greatly increases the sensitivity to rotation of the rotation sensing interferometer of this invention.

The directional couplers non-destructively sample the two pulses in each pulse pair after each pass therethrough and send a pair of pulse samples to the beam splitter once each circulation. The beam splitter sends the two pulse samples of each pair to the detector and signal processor. The detector measures the instantaneous relative phase shift between the two pulse samples and outputs a train of pulses whose amplitude envelope is sinusoidal and has a frequency $$F = (/\lambda)\Omega$$

where D is the loop diameter (for the case of a circular loop), λ is the optical wavelength and Ω is the mechanical rotation rate of the loop in radians per unit time about an axis perpendicular to its plane.

The signal processor or microprocessor in a conventional manner converts the phase information into the angle of rotation of the device or into the rotation rate thereof. It will be noted that the frequency, F, of the envelope of the train of pulses output by the detector is the same as the beat frequency of a ring laser gyroscope having the same loop diameter. One can determine rotation rates of this invention by measuring this frequency, or determine the angle turned through by the interferometer in a given time interval by counting cycles of this waveform as with a ring laser gyroscope.

It is therefore an object of this invention to provide a rotation sensing interferometer which utilizes in its construction optical fiber waveguides.

It is another object of this invention to provide a fiber optic rotation sensing interferometer which is capable of eliminating undesirable mode locking effects.

It is still another object of this invention to provide a fiber optic rotation sensing interferometer which is capable of providing high sensitivity in the measurement of rotation rates extending down to very low rates.

It is a further object of this invention to provide a fiber optic rotation sensing interferometer which is economical to produce.

For a better understanding of the present invention together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
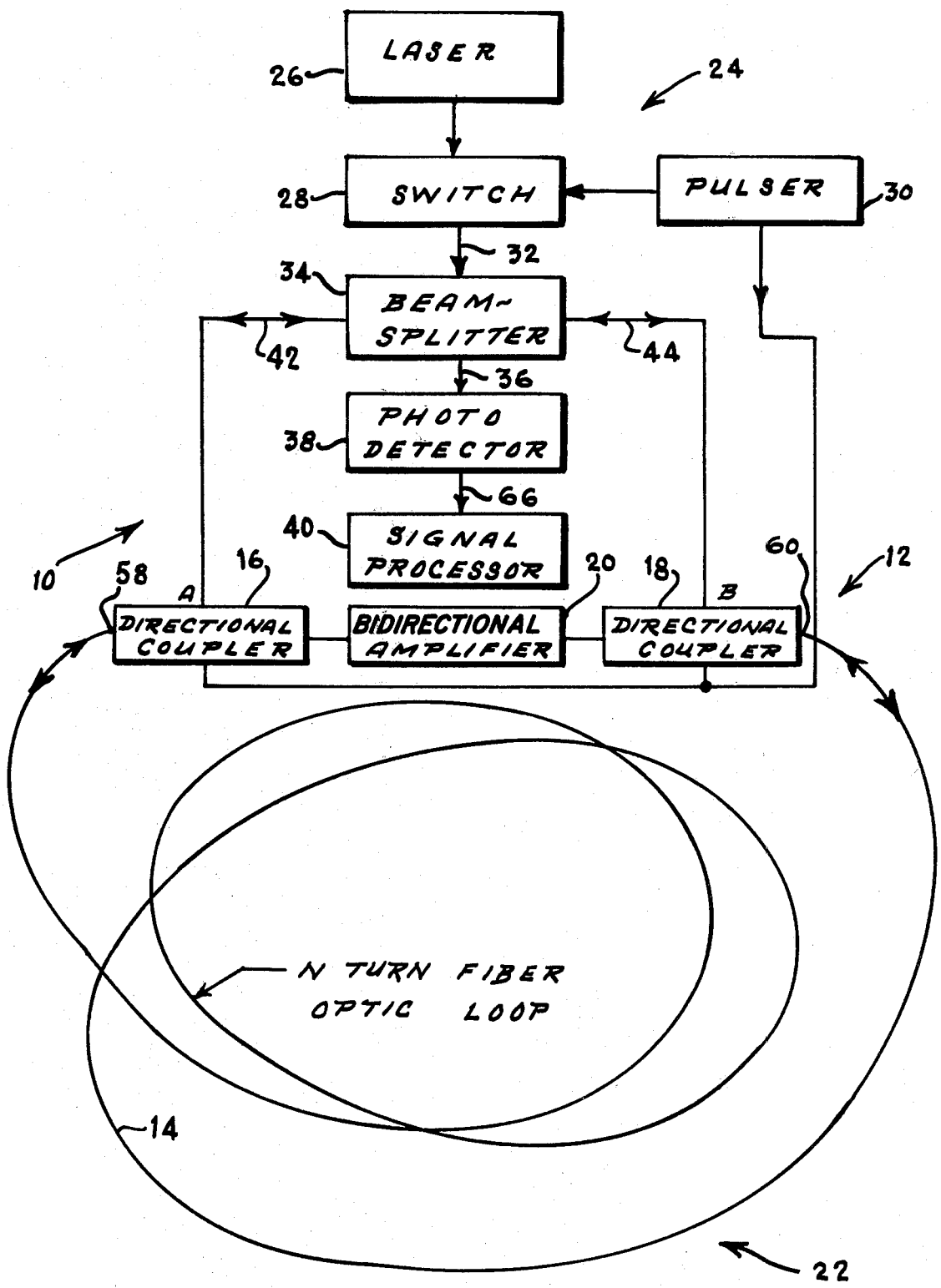
FIG. 1 is a schematic representation of the fiber optic rotation sensing interferometer of this invention.

Reference is now made to FIG. 1 of the drawing which schematically illustrates the fiber optic rotation sensing interferometer 10 of this invention. Interferometer 10 is basically a system having a closed optical path 12 in which mechanical rotation introduces measurable shift in the phase of optical signals transversing the closed path 12. Path 12 incorporates therein a multiplicity N of distinct nondegenerate turns of an optical fiber 14 forming an optic loop 22, having the ends thereof interconnected between a pair of directional couplers 16 and 18, respectively and a bidirectional amplifier 20 (if necessary). If no bidirectional amplifier 20 is utilized or if it is desirable to do so, only one bidirectional coupler may be utilized with the instant invention. Alternatively, the bidirectional amplifier 20 could be located at the opposite symmetry point of the fiber optic loop 22, and a single bidirectional coupler could replace the two directional couplers 16 and 18.

The utilization of the optical fiber 14 allows the design of rugged loops of extremely small toroidal cross-section and very small volume whose area and diameter could be increased to any value consistent with the internal dimensions of a vehicle or system whose rotation is to be sensed. This is of extreme importance in the instant invention since the sensitivity to rotation of interferometer 10 increases in proportion to the effective diameter of the optic loop 22 made up of N turns of an optical fiber 14. This is the case when basically digital operation is applied to the waveform of the amplitude of the output pulse train described hereinabove. In an alternate (analog) method of operation detector 38 would measure only the initial portion of the first period of the envelope function. This requires the addition of a biasing element in the rotation sensing loop. In this case the sensitivity to rotation of the interferometer 10 increases in proportion to the effective area of the optic loop 22 made of N turns of an optical fiber 14. Means for providing the necessary bias have been described in connection with fiber optic gyros.

Interconnected to the closed path 12 of interferometer 10 is any suitable conventional electromagnetic pulsed source 24 such as a conventional Nd;YAG or semiconductor laser 26 which may include as part thereof a conventional switch 28 and pulser 30. Optically aligned with the output 32 (hereinafter referred to as the input pulse 32) of switch 28 is a power divider such as a conventional four port optical coupler in the form of, for example, a beam splitter 34 or a directional coupler. The conventional pulser 30 is utilized to pulse the laser signal if laser 26 utilized is not a pulsed laser. Optically aligned with the output 36 of beam splitter 34 is a conventional photodetector 38 such as a photomultiplier tube or photodiode and a conventional signal processor or microprocessor 40. The operation of photodetector 38 and signal processor 40 will be set forth in detail hereinbelow.

In the proper sequence of operation, beam splitter 34 splits each input pulse 32 into a pulse pair containing two pulses 42 and 44 which circulate in opposite directions about the optical path 12 of the interferometer 10 of this invention. Introducing pulses 42 and 44 into optical path 12 are the pair of directional couplers 16 and 18 (or a single bidirectional coupler).

Figure 2:
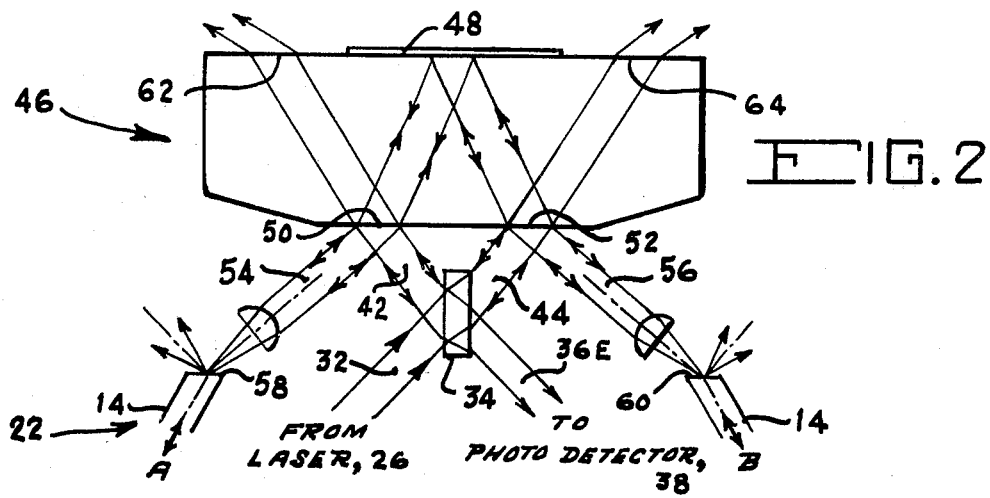
FIG. 2 is a schematic illustration of the directional coupler used in one demonstration of the fiber optic rotation sensing interferometer of this invention.

Referring now to FIG. 2 of the drawing, directional couplers 16 and 18 are shown by an equivalent single element in the form of a monolithic glass prism 46. Prism 46 closes the fiber loop 22 thereby forming the closed optical path 12 of the interferometer 10 of this invention. For ease of understanding, the following description omits the utilization of bidirectional amplifier 20. However, if directional amplifier 20 is utilized it may be incorporated as a part of prism 46 or spaced between a pair of directional couplers as shown in FIG. 1 of the drawing, or located at the opposite symmetry point of the fiber optic loop 22. One face 48 of prism 46 has a fully reflecting surface and it would be adjacent face 48 that amplifier 20 could be incorporated within the system. For injection into path 12, input pulse 32 from laser 26 is split into the pair of pulses 42 and 44 by beam splitter 34 traveling toward prism 46. Pulses 42 and 44 are partially reflected from the glass/air interfaces 50 and 52, respectively, giving rise to beams 54 and 56. These latter two beams 54 and 56 travel directly to the ends 58 and 60 of fiber 14 thereby entering loop 22 in opposite directions. Pulses emerging from loop 22 are carried through interfaces 50 and 52, respectively, and impinge on totally reflective surface 48 from where they are redirected back into loop 22. This closes the path between the two fiber ends 58 and 60 so that the pulses, once introduced into the fiber loop 22, can continue to recirculate in the optical path 12 until they become attenuated by losses. The loop runs between points A and B. The sample pulses 36 are that portion of the pulses emerging from loop 22 and reflected from the glass/air interface 50 and 52 traveling by way of beam splitter 34 to photodetector 38.

The faces 50, 52 and 62, 64 of prism 46 are optically flat and parallel. The reflection coefficient for beams 42, 44, 54 and 56 can be varied between 1% and 10% by rotating the polarization of the light from laser 26. It is clear that the partially reflecting surfaces 50 and 52 when used in this way, provides the function of back-to-back directional couplers 16 and 18 whose coupling coefficients can be varied continuously over the above range.

Operation of the rotation sensing interferometer 10 of this invention commences at the electromagnetic source or laser 26 where a single RF tone pulse, is extracted from laser 26. Referring to FIG. 1 of the drawing, input pulse 32 is introduced, by way of beam splitter 34, into the directional couplers 16 and 18 or as shown in FIG. 2 of the drawing the equivalent prism 46, setting up clockwise and counterclockwise circulating pulses 42 and 44 in optical path 12 which pass the directional couplers 16 and 18 (or prism 46) once for each circulation around the N turn loop 22. Thus, the clockwise recirculating pulse 42 sets up a train of pulses at point A and the counterclockwise recirculating pulse 44 sets up a train at B. In addition the sampled pulses 36 are sent to detector 38 by way of beam splitter 34.

The two pulses 42 and 44 in any coincident pair of these two trains have a mutual relative phase shift of $pN \Delta\phi_1$ where $\Delta\phi_1$ is a Sagnac phase splitting for one circulation around one turn of loop 22, and p is the number of circulations corresponding to the pulse pair in question. That is, the phase splitting for the pulse pair at points A and B is $N\Delta\phi$ at the one circulation, $2 N \Delta\phi_1$ after two circulations, etc. Since for any rotation rate the phase splitting $\Delta\phi$ is now a function of time, the detector output 66 of detector 38 will also be a function of time. Furthermore, it is a discrete function of time. The output of a phase/sensitive detector 38 receiving these pulses will contain a term $-c \cos \Delta\phi$ where c is a constant. Thus output 66 of detector 38 will contain a time sampled cosine waveform, whose envelope is a periodic function of time having a frequency which depends on the rotation rate. The envelope can be written as $$I = -c \cos 2\pi Ft,$$

in which the frequency F is given by the equation $$F = (D/\lambda)\Omega.$$

In other words, the couplers 16 and 18 non-destructively sample pulses 42 and 44 after each pass therethrough and send a pair of pulse samples to beam splitter 34 once each circulation. Beam splitter 34 sends the two pulse samples in the form of output 36 to detector 38. Detector 38 measures the instantaneous relative phase shift between the two pulse samples and provides output 66. Output 66 is fed into the conventional signal processor or microprocessor 40 which converts the phase information into the angle of or rotation rate of the interferometer 10 of this invention. Any number of readily available microprocessors 40 can be used with this invention. Examples of such microprocessors may be the Intel 8085 or Motorola 6800 microprocessors.

The waveform of output 66 of detector 38 can be held at a constant average value by amplifier 20. However, noise introduced by amplifier 20 (if utilized in this system) builds up linearly as a function of time, reducing coherence in the system of this invention and thus reducing the signal-to-noise ratio as a function of time. A given measurement, using the output pulse train resulting from a single input pulse, can continue until the signal-to-noise ratio has dropped to some specified value. This length of time is termed the rotation integration time of the system of this invention. At this time the optical pulses remaining in the optical path 12 are purged, and a new input pulse from laser 26 is introduced into the interferometer 10 to start another train of recirculating pulses and another determination of the rotation rate or angle turned through. Amplifier 20 (if utilized) is operated in a quenched mode, that is it is left on for a time equal to the rotation integration time and switched off briefly between successive rotation integration time intervals. The amplifier 20 operates basically as a linear amplifier whose "on" time is not sufficient to allow noise in the system to build up to saturation or self-oscillation levels.

The number of turns N in loop 22 is an important parameter in the rotation sensing interferometer 10 of this invention. It permits the optimization of the signal-to-noise ratio. The basic principal that applies is similar to that of repeator systems, in which amplifiers are periodically spaced along a transmission system to restore signals to their original level after they have been attenuated by the intervening transmission line section. There is an optimum distance between amplifiers for maximum signal-to-noise ratio, which allow the longest overall transmission path. This optimum spacing comes about essentially because if the amplifiers are too closely spaced an excess of amplifier noise is introduced while if the amplifiers are too widely spaced, the signal-to-noise degradation between any two adjacent amplifiers is excessive. The optimum spacing turns out to be that for which the signal attenuates by the factor $e^{-1}$ or 4.3 dB for the hypothetical limiting case in which the only noise considered is that due to quantum effects. For the same reasons we find that the optimum length for the fiber loop 22 in the interferometer of this invention is that for which the propagation attenuation around the N turns of loop 22 is 4.3 dB. This means, for example, that for fibers having attenuation coefficient ranging from approximately 2 dB per kilometer down to approximately ½ dB per kilometer, the optimum length would range from approximately 2 kilometers up to approximately 10 kilometers, involving transit time extending from the vicinity of 10 $\mu$secs to the vicinity of 50 $\mu$secs. In any event, the optimum is a broad one so that the length can deviate substantially without serious impairment of the signal-to-noise ratio and total integration time.

The rotation sensitivity of interferometer 10 of this invention increases with rotation integration time, and the maximum integration time is a function of system noise. Set forth below is the calculation of the signal-to-noise ratio for the fiber optic rotation sensing interferometer 10 of this invention, and a determination of the theoretical rotation sensitivity of the invention insofar as its dependence on amplified quantum noise is concerned, for the hypothetical limiting case in which the only noise considered is that due to quantum effect.

Referring to FIG. 1, we assume that the directional couplers are switchable, and can be controlled by a signal from the pulser such as to have zero coupling loss during injection of an optical pulse into the loop.

Let the loss per transit around the N-turn loop be exp $(-\alpha l)$ and the gain per transit be exp g, where l is the circumferential length of the loop. Then the net gain per pass is given by exp x where $x = g - \alpha l$. After K passes through the amplifier, an injected signal of power $P_O$ will have power $P_K$ given by $$P_K = P_O e^{Kx} \tag{1}$$

The equivalent input noise power $Q_O$ of the amplifier is expressed by $$Q_O = F h f_c B \tag{2}$$

where F is the amplifier noise factor, $f_c$ it the optical carrier frequency and B is the system bandwidth. The noise power level $Q_K$ after K passes will then be $$Q_K = Q_O(e^x + e^{2x} + \ldots + e^{Kx}) e^{\alpha l} \tag{3}$$

$$= Q_O \frac{e^{Kx} - 1}{1 - e^{-x}} e^{\alpha l}$$

Then the signal-to-noise ratio $\sigma$ after K passes will be $$\sigma = \frac{P_K}{Q_K} = \frac{P_O}{Q_O} \left( \frac{1 - e^{-x}}{1 - e^{-Kx}} \right) e^{-\alpha l} \tag{4}$$

For $Kx \ll 1$ this becomes $$\sigma \sim \frac{P_O e^{-\alpha l}}{Q_O K} \left( 1 + \frac{Kx}{2} \right) \tag{5}$$

When the amplifier gain is set equal to the loop loss, i.e., $x = 0$, $$\sigma \to \frac{P_O e^{-\alpha l}}{Q_O K} \tag{6}$$

Equation (4) implies that $P \leq P_O$, $P_O$ being the largest power the fiber or the amplifier can handle, and therefore x, the net gain, must be less than unity, i.e., x must be negative. If x is positive, then $P_K = P_O$, and the input power becomes $$P_O = P_O^1 e^{-Kx} \tag{7}$$

and $$\sigma = \frac{P_O^1 (1 - e^{-x}) e^{-\alpha l}}{Q_O (e^{Kx} - 1)} \tag{8}$$

When $Kx \ll 1$, $$\sigma \sim \frac{P_O^1 e^{-\alpha l}}{Q_O K} \left( 1 - \frac{Kx}{2} \right) \tag{9}$$

Comparing (9) with (5) we conclude that the S/N ratio is worse if the net gain around the loop is greater than unity than when it is smaller than unity.

In particular, when $|Kx| \gg 1$, when $x < 0$, (i.e., there is net loss around the loop), $$\sigma \to \frac{P_O e^{-\alpha l}}{Q_O} (1 - e^{-x}) \tag{10}$$

whereas when there is net gain per pass $$\sigma \to \frac{P_O^1 e^{-\alpha l} \cdot e^{-Kx}}{Q_O} (1 - e^{-x}) \tag{11}$$

It therefore appears that optimum $\sigma$ is obtained when $x = 0$, i.e., when there is no loss or gain, from which we get $$K_{max} = \frac{P_O e^{-\alpha l}}{Q_O \sigma} = \frac{P_O e^{-\alpha l}}{F h f_c B \sigma} \tag{12}$$

The gain per pass is $e^{+\alpha l}$, of course.

For each transit the transit time difference for the two waves is increased by the basic Sagnac increment $$\Delta t = \frac{4\pi N r^2}{c^2} \Omega \tag{13}$$

where $\Omega$ is rotation rate in radian/sec, giving rise to a photo current proportional to $$2 \sin^2 \frac{\omega_c \Delta t}{2} = 1 - \cos \omega_c t \tag{14}$$

After $2\Delta t$ the photo current is $$1 - \cos 2\omega_c \Delta t \tag{15}$$

After K transits, putting $$K \to \frac{t}{T} \tag{16}$$

the photo current is denoted by $$1 - \cos K \omega_c \Delta t = 1 - \cos \frac{\omega_c \Delta t}{T} \cdot t \tag{17}$$

This means that the frequency of the photo current is $$f_d = f_c \frac{\Delta t}{T} = \frac{2rf_c}{c} \Omega \tag{18}$$

where we have used (13) and $$T = \frac{l}{c} \tag{19}$$

$$N = \frac{l}{2\pi r} \tag{20}$$

The length of time during which the photo current $f_d$ is flowing is, from (12) and (19), $$KT = \frac{P_O e^{-\alpha l}}{Q_O \sigma c} \quad (21)$$

so that, $\nu$, the number of cycles during which one may measure $f_d$, is $$\nu = KTf_d = \frac{2rf_cP_O\Omega}{Q_O \sigma c^2 \alpha} \cdot \alpha l \cdot e^{-\alpha l}. \quad (22)$$

This is clearly a maximum when $$\alpha l = 1 \quad (23)$$

which implies that the optimum gain per pass is e and that the length of the loop is $$l_{opt} = \frac{1}{\alpha} = 2\pi rN, \text{ or}$$

$$N_{opt} = \frac{1}{2\pi r\alpha} \quad (24)$$

so that $$\nu_{max} = \frac{2f_cP_Or}{eQ_O\sigma c^2\alpha}\Omega \quad (25)$$

We note that N drops out, as well as $f_c$, when we substitute for $Q_O$:

$$\nu_{max} = \frac{2}{e}\frac{P_O}{Fh B\sigma c^2 \alpha}\Omega \quad (26)$$

The accuracy with which one can measure $f_d$ is, of course, of the order of one part in $\nu_{max}$.

If we use cycle counting to determine the frequency $\nu$, and count only complete cycles, then from Eq. (22) we have, for the error $\Delta\Omega$ in measuring $\Omega$, $$\frac{\Delta\Omega}{\Omega} = \frac{1}{\nu} = \frac{1}{KTf_d} \quad (27)$$

Using Eq. (22)

$$\Delta\Omega = \frac{c}{2rf_c}\frac{1}{KT} \quad (28)$$

Thus the absolute error is inversely proportional to the integration time KT. However, there is a minimum value for the fractional error in measurement of $\Omega$. This occurs when $\alpha l = 1$, which maximizes Eq. (22). We then have $$(\Delta\Omega)_O = \frac{eFhB\sigma c^2\alpha}{2rP_O} \quad (29)$$

for the value of $\Delta\Omega$ for which $\Delta\Omega/\Omega$ is minimized. The corresponding observation time, which minimizes $\Delta\Omega/\Omega$, is $$(KT)_O = \frac{P_O}{eFhF_cB\sigma c\alpha} \quad (30)$$

Figure 3:
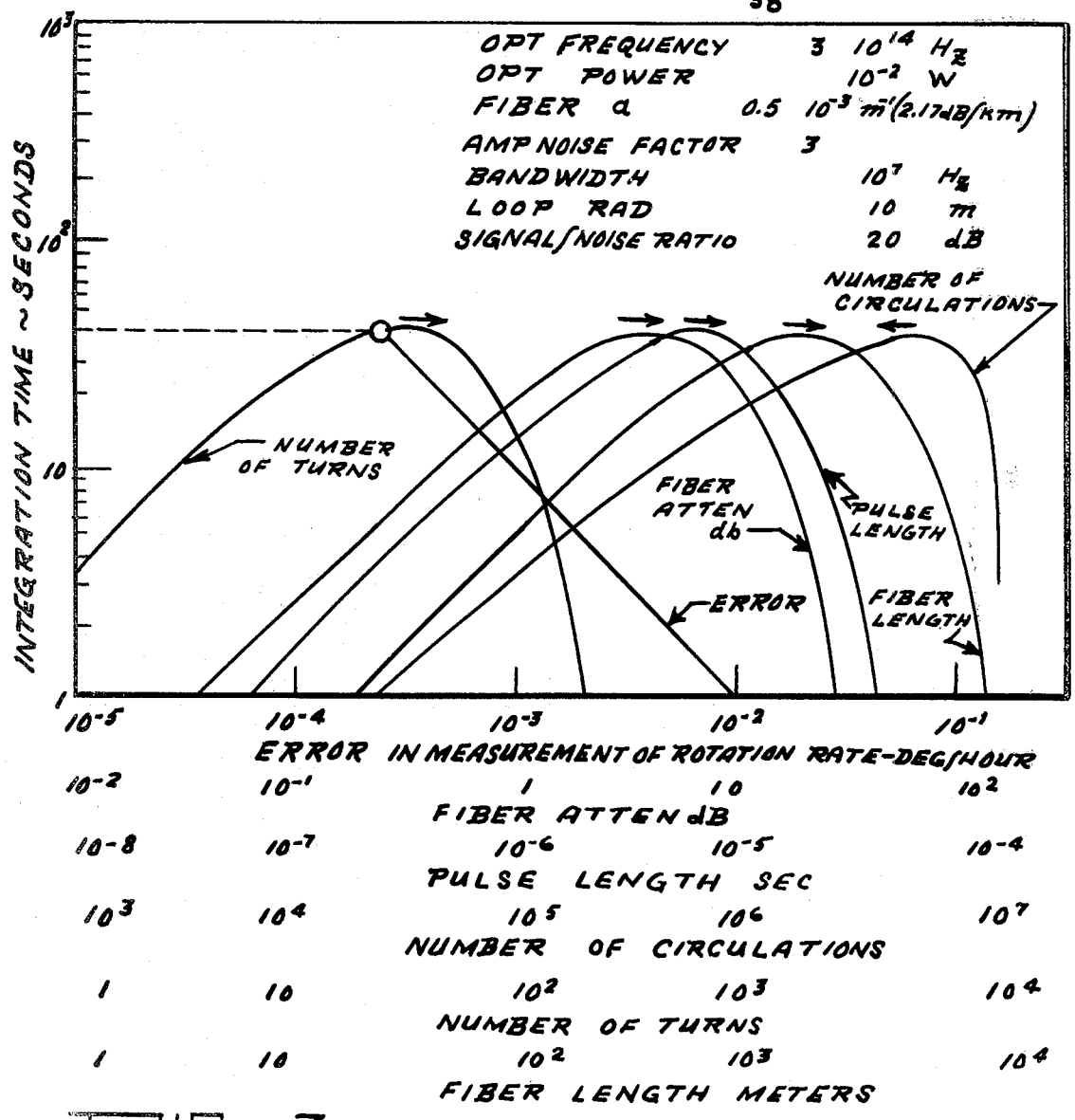
FIG. 3 is a graph related to theoretical rotation sensing quantities as a function of integration time.

FIG. 3 shows the behavior of various quantities as a function of KT for a specific set of assumed values for the frequency and power of the electromagnetic source or laser 26, the attenuation constant of fiber 14, the noise figure of amplifier 20, and the bandwidth and signal-to-noise ratio of the entire system 10. The assumed values for these parameters are listed in FIG. 3. In FIG. 3, the rotation integration time KT, plotted on the vertical scale, is the independent variable, and the various quantities plotted horizontally are dependent variables. Thus to determine the values of the various quantities, one picks a value of integration time arbitrarily, and reads values of the other quantities along a horizontal line drawn through said integration time. Note that the assumed value of the signal-to-noise ratio at the end of the integration process in FIG. 3 is 20 dB. This limits the maximum integration time to the value (40 sec) indicated by the horizontal dashed line. We point out that the values of the error in the measurement of rotation rate shown apply regardless of the actual rotation rate being measured.

Figure 4:
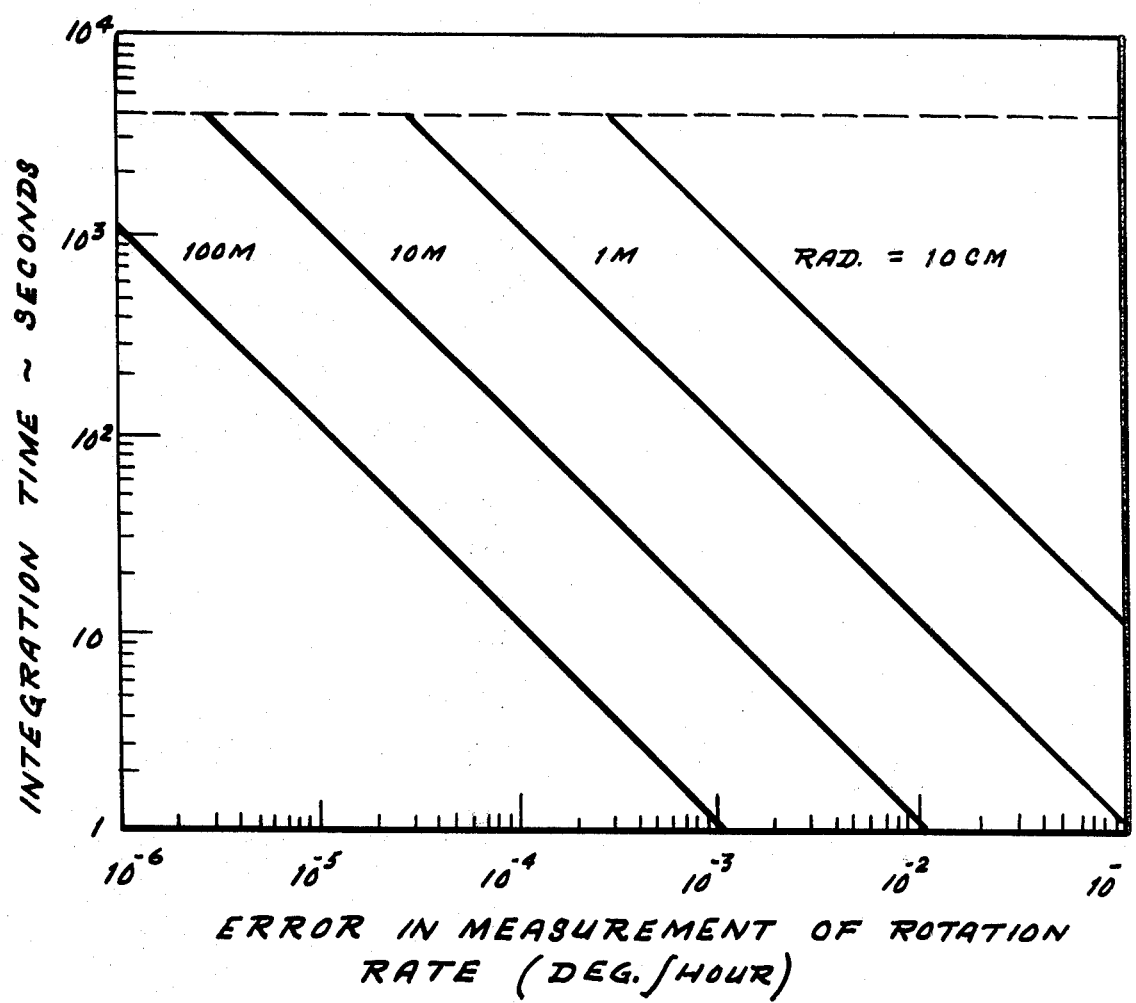
FIG. 4 is a graph related to theoretical error in measurement of rotation rate as a function of integration time.

FIG. 4 shows peripheral values of the error in measurement of rotation rate, defined as values corresponding to integration times for which the signal-to-noise ratio is zero dB. The other assumed parameter values are the same in FIG. 4 as in FIG. 3, except that several values of loop radius, ranging from 10 cm to 100 meters, are used in FIG. 4, as noted on the individual curves.

The effective sensitivity of the rotation sensing interferometer 10 of this invention rests on different phenomena than that of a ring laser gyro. In the former, the sensitivity is determined by amplitude versus noise buildup in the basic loop, while in the latter it is determined by phenomena associated with the ancillary mechanism used to suppress locking.

It is therefore quite evident that the rotation sensing interferometer 10 of this invention contains essential features not found in combination in any other approach to rotation sensing and which are important to the utilization of the full potential of optical waves for rotation sensing. For example:

(1) the optical signals are pulsed, rather than cw as in all previous systems. This allows recirculation of the optical energy in the loop to increase the rotation integration time and hence the rotation sensitivity. It also allows reduction of back-scattered waves which are a source of noise, allowing increase in signal-to-noise ratio;

(2) the optical path 12 is active, containing an optical amplifier 20, this allows a large number of circulations of optical waves around the N-turn loop 22 which multiplies the Sagnac effect, increasing the total rotation integration time and thus increasing the sensitivity to rotation. The use of an amplifier together with pulsed multiple recirculation operation allows very large total rotation integration time to be used together with adjustment for optimum signal-to-noise ratio which is impossible in any other approach to rotation sensing;

(3) the optical path contains a multiplicity of nondegenerate turns which multiply the Sagnac effect, and is a parameter allowing optimization of the signal-to-noise ratio;

(4) the optical path 12 is non-oscillating. Amplifier 20 in the optical path 12 operates as a stable non-oscillating amplifier with optical signals being introduced from an external laser 26. This avoids the mode locking phenomena encountered with ring laser gyroscopes of the past;

(5) the interferometer of this invention has an absolute scale factor which does not require calibration. It uses digital cycle counting to measure rotation rate and rotation angle which is not possible at low rotation rates with continuous wave fiber systems;

(6) the system is basically an integrating rate gyro giving directly the angle turned through by digital cycle counting as is desired in many applications such as navigation; and (7) the system is ideally suited for the use of optical fibers for the rotation sensing loop 22. Attenuation constant for wave propagation in optical fibers have decreased to values which lie very well within the range of high performance. Thus, their utilization permits the design of an all-solid state rotation sensor which is rugged and occupy a very small volume. The use of fibers 14 also allows one to form a multi-turn loop of N nondegenerate turns, whose N becomes an important available parameter allowing one to optimize the signal-to-noise ratio.

Although this invention has been described with reference to a particular embodiment, it will be understood to those skilled in the art that this invention is also capable of further and other embodiments within the spirit and scope of the appended claims.

We claim:

1. A rotation sensing interferometer comprising means for producing an input pulse of electromagnetic radiation, directing means in optical alignment with said electromagnetic radiation producing means for receiving said input pulse of electromagnetic radiation and dividing said input pulse into a concurrent first and a second pulse of electromagnetic radiation, means optically aligned with said directing means for providing a closed path for said first and second pulse to circulate thereabout, coupling means optically interconnecting said directing means with said path providing means for receiving said first and second pulse electromagnetic radiation and for inputting and directing in opposite directions around said path said first and said second pulse, for non-destructively sampling said first and said second pulse after each pass therethrough and for extracting a first and a second pulse sample from said path once each circulation, said directing means being in optical alignment with said coupling means for receiving said first and said second pulse sample and directing said first and said second pulse sample therefrom as an output, detecting means in optical alignment with said directing means for receiving said output and measuring the instantaneous relative phase shift between said first and said second pulse sample and providing an output in the form of a frame of pulses containing phase information and means for receiving said output from said detecting means and converting said phase information into the angle of said rotation or rate of said rotation of said interferometer.

2. A rotation sensing interferometer as defined in claim 1 wherein said path providing means comprises a loop made of an optical fiber having multiple turns therein.

3. A rotation sensing interferometer as defined in claim 2 wherein said phase information of said first and second pulse samples each have an amplitude envelope defined by the expression $-c \cos 2\pi F t$ wherein $t=$ the transit time around said loop and F is defined by the expression $(D/\lambda)\Omega$ where $D=$ said loop diameter (for the case of a circular loop), $\lambda=$ the optical wavelength and $\Omega=$ the mechanical rotation rate of said loop in radians/unit time about an axis perpendicular to its plane.

4. A rotation sensing interferometer as defined in claim 1 wherein said path providing means having means therein for amplifying the power of said first and said second pulse of electromagnetic radiation passing therethrough.

5. A rotation sensing interferometer as defined in claim 4 wherein said coupling means comprises at least one directional coupler.

6. A rotation sensing interferometer as defined in claim 5 wherein said path providing means having means therein for amplifying the power of said first and said second pulse of electromagnetic radiation passing therethrough.

7. A rotation sensing interferometer as defined in claim 6 wherein said directing means comprises a beam splitter.

8. A rotation sensing interferometer as defined in claim 7 wherein said detecting means comprises a photomultiplier.

9. A rotation sensing interferometer as defined in claim 8 wherein said phase information converting means comprises a microprocessor.

10. A rotation sensing interferometer as defined in claim 9 wherein said electromagnetic source comprises a laser.

* * * * *